United States Patent
Begeja et al.

(10) Patent No.: US 7,219,054 B1
(45) Date of Patent: May 15, 2007

(54) SYSTEMS AND METHODS FOR GENERATING AN ANNOTATION GUIDE

(75) Inventors: Lee Begeja, Gillette, NJ (US); Harris Drucker, Long Branch, NJ (US); David Crawford Gibbon, Lincroft, NJ (US); Allen Louis Gorin, Berkeley Heights, NJ (US); Patrick Guy Haffner, Atlantic Highlands, NJ (US); Steven H Lewis, Middletown, NJ (US); Zhu Liu, Marlboro, NJ (US); Mazin G Rahim, Warren, NJ (US); Bernard S. Renger, New Providence, NJ (US); Behzad Shahraray, Freehold, NJ (US)

(73) Assignee: AT&T Corp., New York, NY (US)

( * ) Notice: Subject to any disclaimer, the term of this patent is extended or adjusted under 35 U.S.C. 154(b) by 940 days.

(21) Appl. No.: 10/407,964

(22) Filed: Apr. 4, 2003

(51) Int. Cl.
*G10L 15/00* (2006.01)

(52) U.S. Cl. .................................................... 704/231
(58) Field of Classification Search ................. 704/231
See application file for complete search history.

(56) References Cited

U.S. PATENT DOCUMENTS 6,378,132 B1 * 4/2002 Grandin et al. ............. 725/146
7,149,687 B1 * 12/2006 Gorin et al. ................ 704/243

\* cited by examiner

*Primary Examiner*—Susan McFadden

(57) ABSTRACT

Systems and methods for generating an annotation guide. Speech data is organized and presented to a user. After the user selects some of the utterances in the speech data, the selected utterances are included in a class and/or call type. Additional utterances that belong to the class and/or call type can be found in the speech data using relevance feedback, data mining, data clustering, support vector machines, and the like. After a call type is complete, it is committed to the annotation guide. After all call types are completed, the annotation guide is generated.

33 Claims, 7 Drawing Sheets

SYSTEMS AND METHODS FOR GENERATING AN ANNOTATION GUIDE

BACKGROUND OF THE INVENTION

1. The Field of the Invention

The present invention relates to systems and methods for generating an annotation guide. More particularly, the present invention relates to systems and methods for interactively generating an annotation guide from speech data.

2. Introduction

Dialog applications are applications that are often used to automate the process of receiving and responding to customer inquiries. Dialog applications use a combination of voice recognition modules, language understanding modules, and text-to-speech systems to appropriately respond to speech input received from a user or a customer. Billing inquiries, information queries, customer complaints, and general questions are examples of the speech input that is received by dialog applications. The response of the dialog application to a particular speech input depends on the logic of the dialog application.

The development of a successful dialog application, however, is a time-consuming process and requires a significant amount of manual labor because of the nature of the tasks being performed. One of the tasks performed in the development of a dialog application is the generation of an annotation guide that is used to annotate or label raw speech data. The annotation guide is generally created by a user experience person (or other user) that is familiar with the purposes and goals of the dialog application. Becoming familiar with the purposes and goals of the dialog application is also a labor-intensive process.

Currently, the generation of an annotation guide requires the user experience person to examine the raw speech data and create the categories, call types, and examples that are usually included in the annotation guide. The annotation guide aids the development of a dialog application because the annotation guide is used by labelers to classify the raw speech data with the call types defined by the user experience person in the annotation guide. The annotation guide helps insure that different labelers classify similar utterances with the same call type.

The ability to properly classify the raw speech data ultimately has a significant impact on whether the dialog application can respond to speech input appropriately. An annotation guide that does not sufficiently define the call types introduces potential errors into the dialog application because the speech data may be labeled incorrectly by the labelers. If incorrectly labeled or annotated speech data is used to train portions of the dialog application such as the natural language understanding modules, the dialog application will clearly not function properly and will frustrate customers. Thus, the development of a quality annotation guide is important to the development of a quality dialog application.

A labeler uses the annotation guide to determine whether a particular utterance should be labeled with a particular call type. For example, an annotation guide may describe a Pay_Bill call type used to label utterances that suggest the customer wants to pay his or her bill. The following utterances from raw speech data, for example, should be labeled with the Pay_Bill call type:

I want to pay a bill; and

I got mail and I have my credit card ready.

A poorly developed annotation guide may not provide sufficient guidance to a labeler to properly annotate the second example of "I got mail and I have my credit card ready." Without the guidance of the annotation guide, different labelers may assign different call types to this example. For these reasons, it is desirable to have a well developed and thought out annotation guide to assist in the annotation of the speech data.

As previously mentioned, however, the user experience person does not currently have any way to develop the annotation guide other than by directly examining the raw speech data. Not surprisingly, the development of the annotation guide can be a lengthy process. In other words, the development of an annotation guide is a slow and tedious process and the time required to develop the annotation guide introduces additional cost into the dialog application. Systems and methods are needed to reduce the time required to develop an annotation guide.

BRIEF SUMMARY OF THE INVENTION

These and other problems are overcome by the present invention, which relates to systems and methods for generating an annotation guide. An annotation guide is typically used to label or annotate a corpus of speech data and is often used, for example, in the development of a dialog application. The annotation guide defines the call types identified by the creator of the annotation guide and typically provides examples for each call type. Typically, the selected call types are strongly related to the purposes and goals of a dialog application. The creator of the annotation guide is a user that may be referred to herein as a user experience person. The user experience person is familiar with the purposes of the annotation guide being developed and uses this information to develop the annotation guide and the call types in the annotation guide.

The development of the annotation guide usually begins after a corpus of speech data or utterances has been collected. The speech data is then analyzed in a manner that presents a user with a group of utterances from the speech data. The speech data is often analyzed using, for example, data clustering, string searching, data mining, and the like. The user experience person creates a call type by identifying the utterances that should be included in a particular call type. The selected utterances may then be used to select or identify additional utterances from the speech data that are similar to the selected utterances. In other words, the present invention uses the selected utterances as feedback to locate additional utterances that are similar to the selected utterances and that are close in character to the selected utterances. Some of the additional utterances can then be tagged with the same call type. The speech data can be examined using searching techniques, clustering, data mining, vector support machines, seeding techniques, and the like.

When a call type is completed, the call type is committed to the annotation guide and the user experience person can begin working on another call type. Typically, the user experience person provides each call type with a name and a definition or description. The user experience person also has the ability to include both positive and negative examples with each call type in the annotation guide. Also, the user experience person has the ability to change a particular call type even after it is committed. The call types of an annotation guide can also be refined as additional utterances are added to the speech data.

After all of the call types have been committed, the annotation guide is generated automatically into a file, a document, a spreadsheet, and the like. The annotation guide can then be used by labelers to annotate the speech data. In other words, the utterances in the speech data are labeled with one or more call types and the annotated speech data can be used to train, for example, natural language understanding models in the dialog application in one embodiment.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Dialog applications help automate systems to receive and respond to client input or speech. The speech is recognized using an automatic speech recognition system and interpreted using a natural language system. The dialog application then generates a response based on what is understood by the natural language system. Dialog applications are used to automate, for example, call centers by receiving customer calls and either automatically handling the customer inquiry or by directing the customer to an appropriate person within the call center.

Figure 1:
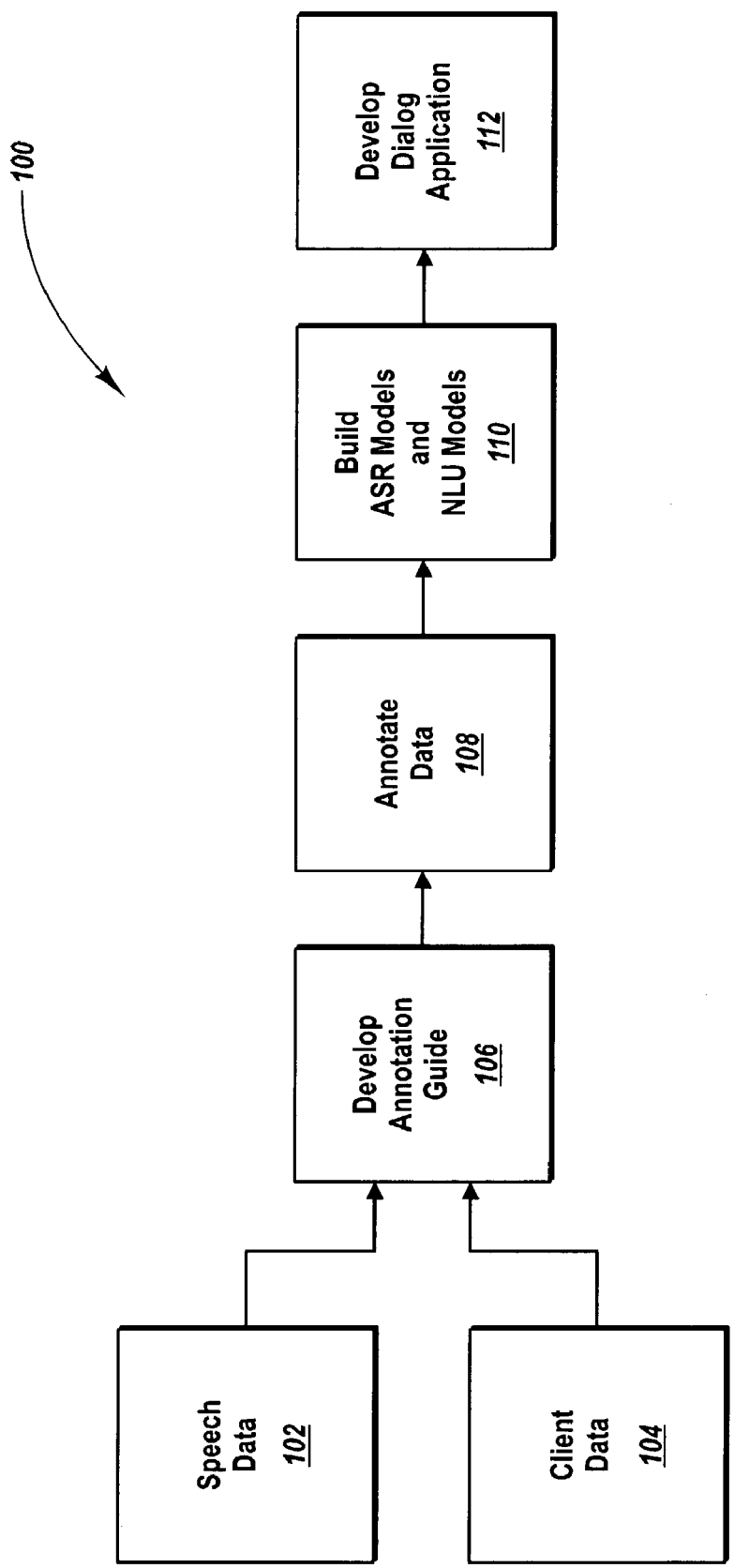
FIG. 1 illustrates is a block diagram that illustrates an exemplary method for creating a dialog application.

As previously mentioned, the development of a dialog application can be a time-consuming process and FIG. 1 illustrates an example of a process that is used to develop a dialog application. The development of a dialog application often begins with the collection and transcription of the speech data 102. The speech data 102 corresponds to utterances that are likely to be experienced by the dialog application.

In addition to the speech data 102, it is useful to collect client data 104 as well. Collecting the client data 104 includes obtaining an understanding of the business that desires a dialog application and ascertaining the purpose and goals that the dialog application should achieve. Collecting the client data 104 is labor-intensive and it is advantageous to work closely with the business to fully understand what the business wants to automate in the dialog application. The user experience person is often involved in the collection of the client data 104. The categories and call types that are ultimately included in an annotation guide are often derived by the user experience person from the client data 104 and the speech data 102.

After the client data 104 and the speech data 102 are collected, an annotation guide is developed (106) by a user experience person or other user. The user experience person has an understanding of the client data 104 and of the speech data 102 and uses the systems and methods described herein to develop and generate the annotation guide. The annotation guide is used by labelers to annotate the speech data 102. Often, the development of the annotation guide can occur concurrently with the collection and transcription of the speech data. When the annotation guide is complete, the speech data is annotated (108). Next, automatic speech recognition (ASR) models and natural language understanding (NLU) models are constructed and trained (110) using the annotated speech data as well as the raw speech data. Finally, the dialog application is developed (112) and prepared for testing and/or use by the business.

The present invention relates to systems and methods for generating an annotation guide. The present invention enables a user experience person to generate an annotation guide in an interactive manner in one embodiment. In another embodiment, the annotation guide can be generated automatically using the speech data and the client data. The time required to generate the annotation guide is significantly reduced, which results in lower cost. The user experience person can analyze and organize the speech data in various ways to ensure that the categories and call type are complete and to provide sufficient guidance to minimize the likelihood of assigning different call types to similar utterances.

One purpose of the annotation guide is to help labelers classify the utterances in the speech data such that the dialog application can respond appropriately to speech input from clients or customers. To achieve this goal, the speech data used to develop the annotation guide typically includes a large number of utterances. For example, the speech data may include thousands of utterances. Clearly, developing an annotation guide can be a complex undertaking and affects whether the speech data is properly labeled.

In one embodiment of the present invention, the development of an annotation guide typically begins by analyzing the speech data in a manner that permits the user (user experience person) to include (or reject) utterances that should be included (or rejected) from a working class that the user has preliminarily identified. Potential utterances are presented to the user and the user identifies or selects the utterances that should be included in the working class. After the user is satisfied that a class is adequately defined, the class is committed to the annotation guide and the user can begin defining or developing another class.

Figure 2:
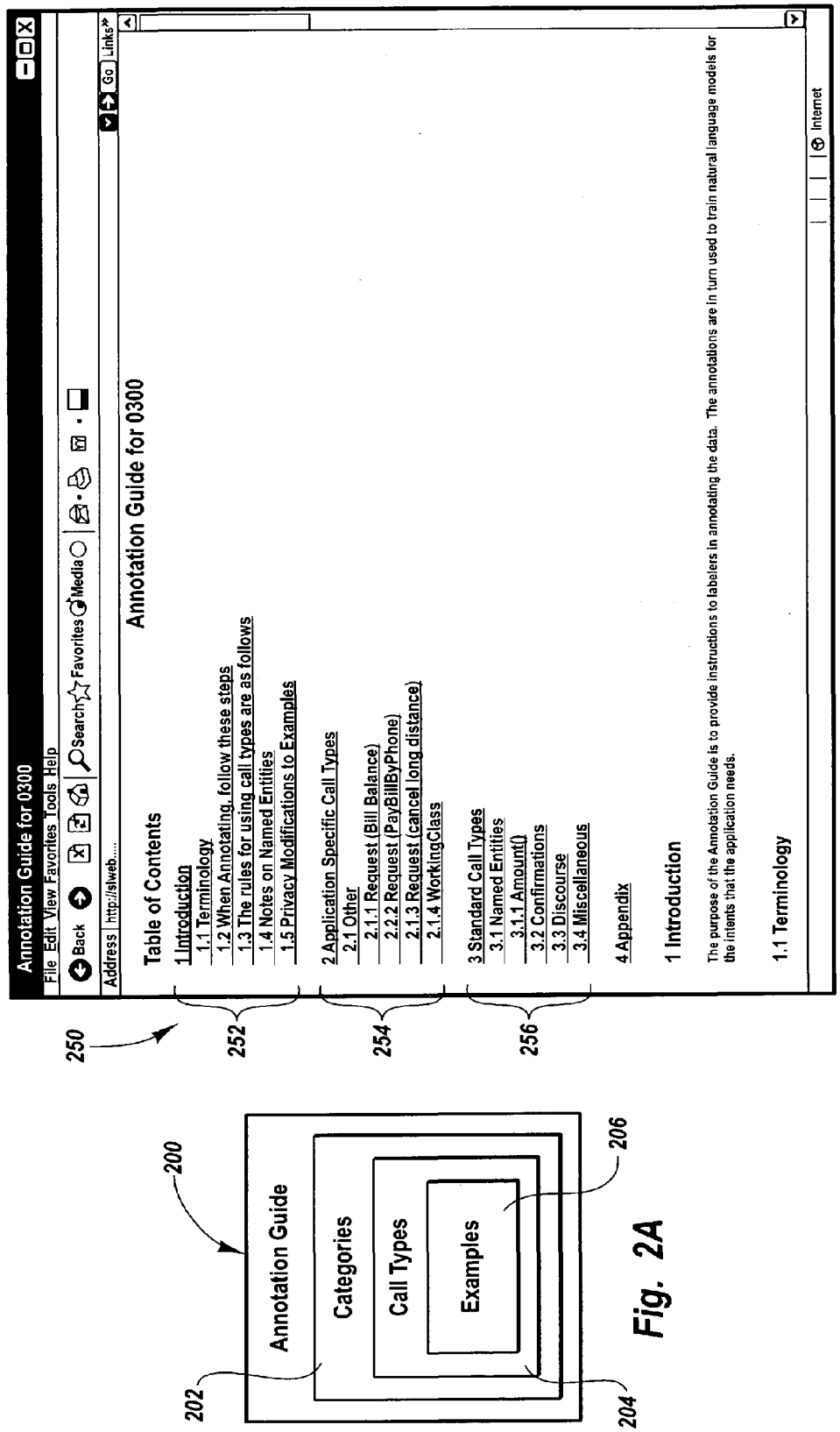
FIG. 2A illustrates an exemplary annotation guide.
FIG. 2B illustrates the table of contents for one embodiment of an online version of an annotation guide.

FIG. 2A is a block diagram that illustrates an exemplary annotation guide that is used to annotate a corpus of speech data. The annotation guide 200 provides instructions to labelers and the annotated speech data is used to train natural language models. The annotation guide 200 is often a text or word processing file, paper document, spreadsheet, or electronic document that is used as a reference for classifying utterances.

To help label the speech data, the annotation guide 200 includes categories 202, which are often divided into multiple call types 204. Each call type usually includes positive examples of utterances that belong in a particular call type as well as negative examples of utterances that do not belong in a particular call type. The call types 204 may also be referred to herein as classes. The annotation guide 200 is typically used in the annotation of speech data that corresponds to telephone calls or utterances received over the telephone. However, the annotation guide may also be used to label utterances that were not telephone calls. The annotation guide can be used to classify electronic messages such as chat and email. In other words, the annotation guide can be used to classify audio, text, transcribed speech, and the like. This enables a dialog application, for example, to respond to customer inquiries that are submitted over the Internet using email or chat, for example. Instead of generating a speech response over the telephone, the dialog application generates an email response or a chat response.

For example, a business that is involved with prescription drugs may receive customer inquiries relating to prescription orders, billing questions, and the like. The client data includes information about the prescription drug business and helps identify what the business wants to automate in a dialog application. An annotation guide for this business includes several categories of call types that are related to the types of calls received by the business. One category of call types may be a service category which is related to inquiries about prescription orders or plan details. Another category of call types may be a billing category that is related to customer inquiries about billing, payment, or costs. One of skill in the art can appreciate that an annotation guide can describe multiple categories and call types and each annotation guide is not required to have the same categories or call types.

The call types, in one embodiment, are often generally represented as: Verb(Object). Exemplary verbs include, but are not limited to: ask, cancel, change, combine, and the like. The object relates to a specific call type. The selection or choices of verbs and objects is often specific to a particular business and to the goals that the dialog application is intended to achieve.

Using this format to represent the call types 204, the service category may include an Ask(Info) call type, an Ask(Insurance) call type, a Cancel(Miscellaneous order) call type, and the like. One of skill in the art can appreciate that a large number of different categories and call types can be defined and created by a user experience person.

In each call type, the annotation guide 200 usually includes examples 206. For instance, the Change(Credit Card) call type, which may in the billing category, may include the following positive examples:
  yes I need to change the credit card number in my account
  uh I have credit cards on my plan and I want to remove them The Change(Credit Card) call type may also include the following negative examples:
  I just received a bill and I thought you were supposed to charge the amount on my card (Use Verify(Credit Card) call type)

Using the annotation guide, a labeler labels other utterances in the speech data that are like these examples as being of a particular call type. The negative examples for a particular category may even identify the appropriate call type as illustrated above.

FIG. 2B illustrates a Table of Contents for an exemplary annotation guide. In this example, the table of contents 250 includes an introduction section 252 that references terminology, annotation instructions, and the like of the annotation guide. The section 254 references categories and call types that are specific to a particular dialog application. The section 256 references categories and call types that can be standard across multiple dialog applications.

The following example further illustrates an example of a call type that might be described in an annotation guide. This example illustrates the specific call type Ask(Info) in the service category and provides information that permits labelers to appropriately label utterances such that a natural language model can be trained to respond to this call type. This example illustrates both a category and one call type within the category.

2. Service Category: Ask( )—General or Vague
    The Ask( ) call types are used for vague or very general, non-specific questions or requests.
    2.1 Ask(Info)—Vague
      The vague label for callers asking for information, without stating the specific information they want.
      Use Ask(Info) Examples:
        1. yes I have a problem
        2. I need information
        3. I have a question
      Do NOT use Ask(Info) Examples:
        1. I need an address (Use Request(MailingAddress))
        2. What do I do with my prescription Using the annotation guide, a labeler annotates speech data and assigns at least one call type to each utterance in the speech data.

Figure 3:
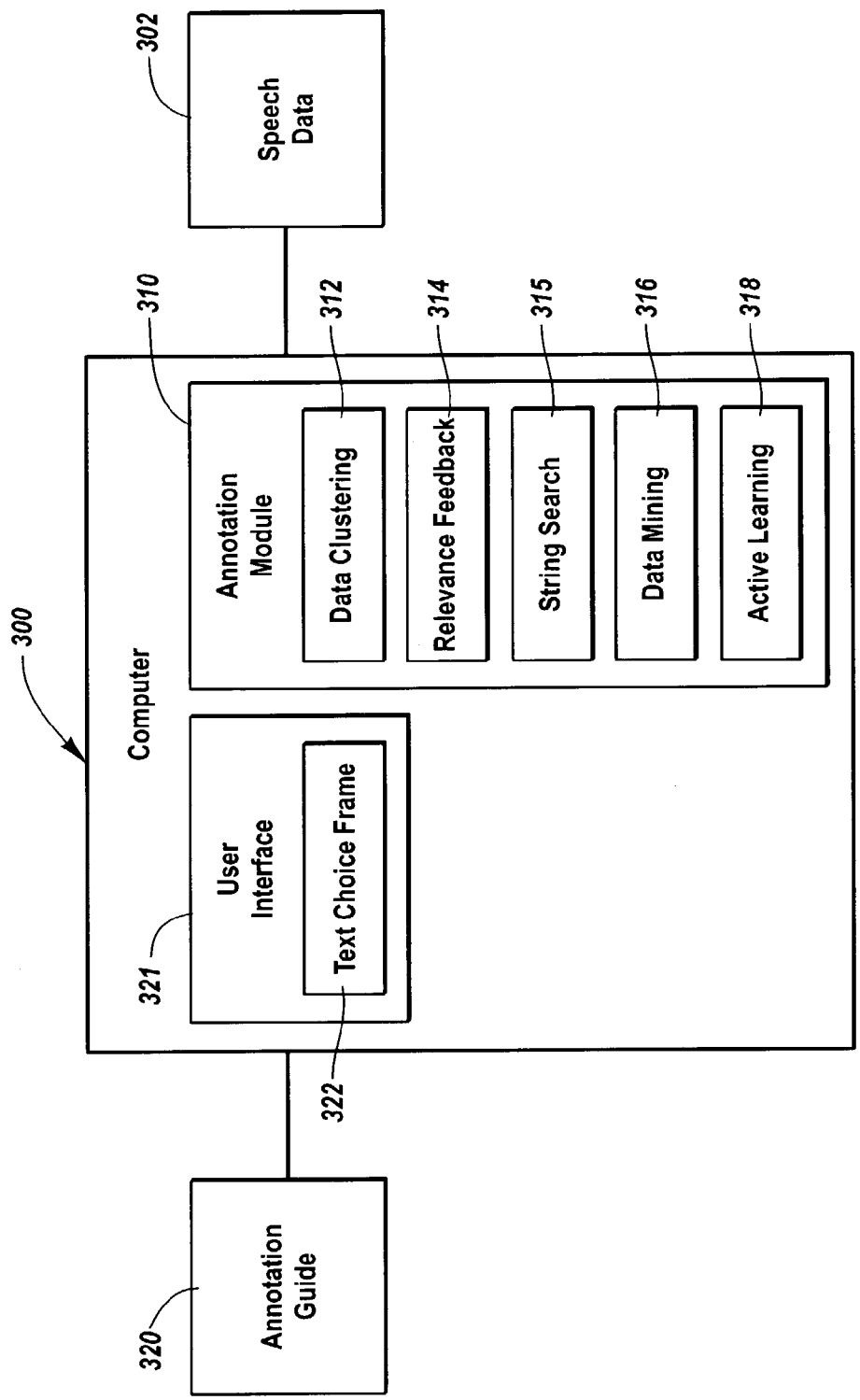
FIG. 3 illustrates one embodiment of an annotation module used to generate an annotation guide.

FIG. 3 illustrates an annotation module that reduces the time required to generate an annotation guide and is used interactively or automatically to generate an annotation guide. The annotation module 310 is loaded on a computer 300 or can be accessed remotely over a network. The computer 300 in this example represents a variety of different computing configurations through which an annotation guide may be developed and generated. The computer 300, for example, may represent a network of computers or a single computer that has access to the annotation module and other resources such as the Internet, spreadsheets, and other files. The annotation module 310 may be used in conjunction with other modules or programs to facilitate accessing the relevant data. For example, the annotation module 310 may be used within a browser to access data over a network connection.

FIG. 3 also illustrates that the computer 300 generates a user interface 321 that includes a text choice frame 322 through which the utterances identified by the annotation module 310 are displayed to the user experience person. Through the text choice frame 322, a user experience person provides input that is used to further define the call types of the annotation guide 320. For example, a user experience can provide input that selects utterances to be included in a particular call type. The input provided by a user experience person through the user interface 321 is described in more detail with regard to FIGS. 5, 6, and 7.

The annotation module 310 provides multiple data analyzing functions that help the user identify and define categories, call types, and examples of call types to be included in the annotation guide. In one embodiment, the annotation module 310 provides interactive tools to create and define call types. The tools can use supervised learning and/or unsupervised learning techniques.

The data clustering module 312 is a module that accesses the speech data and organizes the speech data into N groups of clusters, where N is typically selected by the user. The clusters often use word distance parameters to form the N clusters. Each cluster is associated with a value that indicates the consistency of each cluster. A user can then select a cluster and the utterances in that cluster are presented to the user. The user can easily select specific utterances or reject specific utterances for a particular call type or class. One of skill in the art can appreciate that the data clustering module 312 can also cluster the speech data using N-grams, distances between groups of words, phrases, named entities, and the like. Generally, the data clustering module 312 generates clusters of utterances that are related.

The relevance feedback module 314, in one embodiment, is used by the annotation module 310 to help find a larger group of utterances of a specific call type or class using utterances identified by a user and is an example of supervised learning in one embodiment. For example, the user can identify specific utterances as being of a particular call type and the relevance feedback module 314 can access the speech data 302 and find similar utterances. Alternatively, the relevance feedback module 314 can also be used to exclude utterances from a call type or class. More generally, the relevance feedback module 314 is able to examine actions taken by the user to better define a particular call type or class.

For example, a user experience person may review a group of utterances and identify both positive utterances and/or negative utterances from that group of utterances. The relevance feedback module 314 may use support vector machines to classify the positive utterances and/or negative utterances. Using the support vector machines, other utterances in the speech data can be ranked or assigned a probability. The relevance feedback module 314 returns the utterances that have the highest probability according to the support vector machines or other classifier. The relevance feedback module 314 can be used iteratively to further refine the utterances that are included in a particular call type. In one embodiment, the relevance feedback module 314 is used iteratively until the utterances identified by the relevance feedback module 314 are consistent. The relevance feedback module 314 converges on the most relevant utterances in the speech data for a particular category or call type.

The string search module 315 is a module that permits the user experience person to find utterances in the speech data 302 using a string or a string variant. For example, the user experience person may want to find all utterances that include the string "credit card" and the string search module is used to find utterances in the speech data 302 that satisfy the string. The string search module 315 can also be used to search for synonyms, string variants, and the like. The utterances found by the string search module 315 are presented to the user.

The data mining module 316 is another module that is used to find and categorize utterances in the speech data using various data mining techniques. The data mining module 316 uses methods that return an interesting group of utterances. The data mining module 316, or other modules, can utilize the metadata associated with the speech data, synonyms, query expansion methods, or other speech related parameters. For example, the data mining module may return each utterance that was the first utterance of a conversation. Alternatively, the data mining module may return the longest utterance of a particular conversation. In addition, the data mining module 316 can use decision trees, neural networks, and the like or any combination thereof to find an interesting group of utterances in the speech data.

The active learning module 318 can track the actions of the user experience person to help formulate the call types as well as help in the development of future annotation guides and dialog applications. In addition, the active learning module 318 can be used to classify utterances that are difficult to place in a particular call type. For example, a user may select exemplary utterances (both positive and negative) of a particular call type. The active learning module 318 can construct a classifier using the exemplary utterances and then rank the utterances in the speech data using the classifier. The active learning module 318 can use support vector machines for this purpose as previously described. The active learning module 318 selects utterances that are not clearly included or excluded from a particular call type. In other words, the active learning module 318 selects marginal utterances and the marginal utterances are then presented to the user experience person. The user experience person can then make a determination as to whether the marginal utterances should or should not be in a particular call type. The active learning module 318 can also be used iteratively.

The annotation module 310 uses various modules to find additional utterances that are like a particular set of utterances or to exclude some utterances from being included in a particular set of utterances. The annotation module 310 is not limited to these modules, but may use other modules and methods for analyzing, organizing and displaying the speech data 302 in a manner that permits the annotation guide 320 to be prepared for use in annotating the speech data 302.

Generating an annotation guide typically begins when the speech data is examined by the annotation module and a group of utterances are presented to a user. The annotation module analyzes the speech data using various modules previously described to present utterances to the user. Presenting utterances to a user using the annotation module, for example, includes analyzing the speech data such that the speech data is organized in a particular way. For example, the speech data is analyzed using data clustering, string searches, data mining, and the like or any combination thereof. After the data is analyzed, a group of utterances is displayed to the user. The user provides input to select some of the utterances from the presented group of utterances. The user-selected utterances are then used as feedback by the relevance feedback module to find additional utterances that are similar to the user-selected utterances. When the class or call type the user is working on is completed, the class or call type is typically committed and is included in the annotation guide when the annotation guide is generated.

The creation of a call type or class often starts by retrieving a group of utterances from the speech data. For example, a user may retrieve all utterances that contain a particular string or that are in a particular cluster. The user can then select specific utterances from the retrieved utterances that are appropriate for the class or call type that is being created. The call type can be further defined as previously described using the annotation module.

Figure 4:
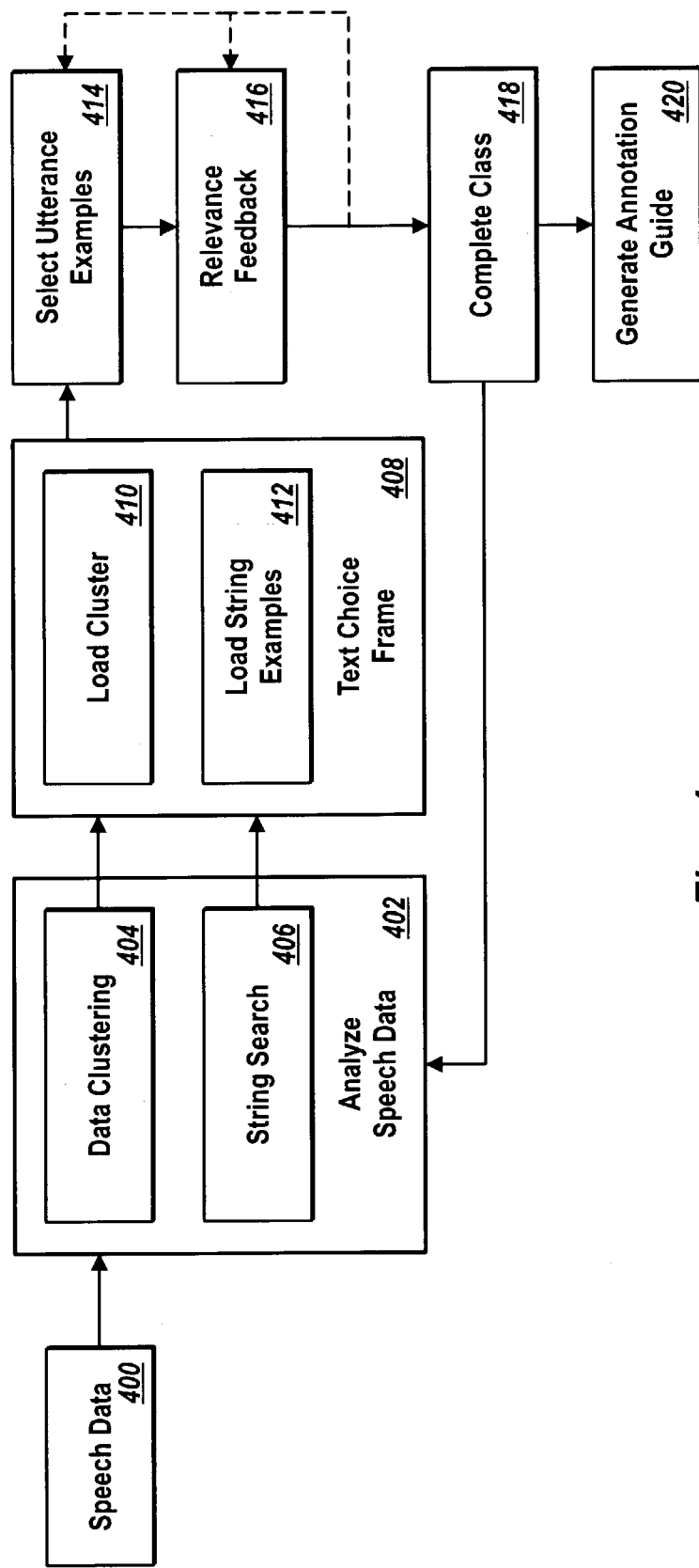
FIG. 4 illustrates one embodiment of a method for generating an annotation guide using one or more data modules to analyze the speech data.

FIG. 4 is a block diagram that illustrates one example of the generation of an exemplary annotation guide for speech data. The process of generating an annotation guide begins by analyzing the speech data 400. In this example, the speech data 400 is organized using data clustering 404 or using a string search 406, although the speech data 400 can be analyzed or organized using any of the modules illustrated in FIG. 3. As previously mentioned, data clustering 404 organizes the speech data 400 into N clusters, where N is often specified by a user, although the number of clusters can be determined by default or automatically based on the speech data.

The clusters are visually displayed to the user via a bar chart in one example. The height of the bars in the bar chart may indicate the number of utterances or elements in each cluster and the clusters are typically ordered such that the most consistent cluster is, for example, displayed first. Selecting a particular cluster loads the selected cluster (410) or group of utterances into a text choice frame 408 and the text of the utterances is displayed to the user experience person.

The string search 406 searches the speech data 400 for utterances that include a particular string or string variant. The text of the utterances found by the string search 406 is loaded (412) and displayed in the text choice frame 408. In one embodiment, the speech data 400 can be initially analyzed using data mining or active learning, for example.

In another embodiment, the text of selected or random utterances is simply displayed to the user experience person. In other words, the speech data is not initially analyzed. Rather, a group of utterances is simply retrieved from the speech data. The user experience person can simply begin to identify the utterances that belong in a particular class from the group of retrieved utterances. In this case, the initial utterances selected by the user experience person may be used to seed a search or serve as the basis by which other utterances are identified from the speech data. Relevance feedback, for example, can locate a larger group of utterances that are similar to the utterances selected by the user experience person.

After the speech data is organized and loaded into the text choice frame 408, a user is able to select utterance examples (414) as previously described. The relevance feedback 416 can use the user-selected utterances to identify additional utterances that should be in a particular class or call type. The selection of utterance examples and relevance feedback can be performed iteratively until the annotation module selects utterances that are consistently in a class or call type. The relevance feedback 416 can also be used to identify utterances that should not be included in a particular class. In addition, some utterances may be included in more than one class or call type.

Next, the user can complete a particular class 418 (or call type) and begin organizing (402) the speech data 400 again to generate another class or call type of speech data. The user can also write a description of the class and of the call types in each class that is associated with the completed class and included in the annotation guide. After all of the classes are complete, the annotation module can generate an annotation guide 420.

Figure 5:
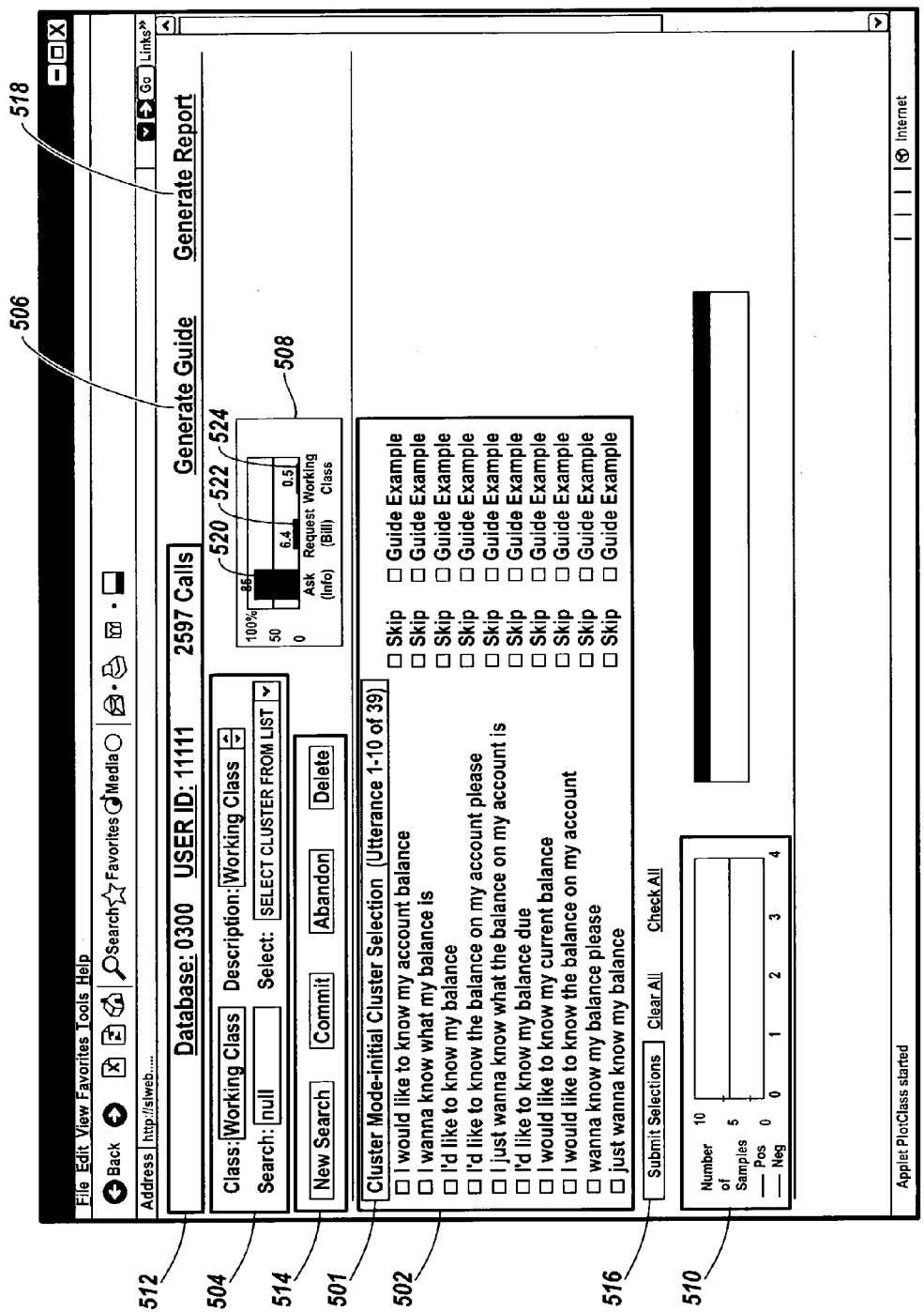
FIG. 5 illustrates an exemplary embodiment of a screen shot that illustrates the generation of classes that are included in an annotation module.

FIG. 5 is an example of a screen shot illustrating aspects of automatically generating an annotation guide. The screen shot of FIG. 5 illustrates identifying data 512 that describes the speech database being used, the number of utterances or calls in the database, and an identifier. The user has preliminarily provided identifying information 504 that includes a working class or call type and a description of the working class or call type. The identifying information 504 also provides a search box where the user can enter a string used to find utterances in the speech data. The identifying information 504 also includes a pulldown list that permits the user to select a cluster. Utterances in the cluster selected from the pulldown list are then displayed to the user.

In this example, the user has organized the speech data using data clustering, as illustrated by the title 501 of the text 502. The text 502 of utterances in the cluster selected by the user is displayed. The text 502 can correspond to an existing class that is being edited or refined or to a working class or call type. The bar chart 508 includes the bars 520, 522, and 524. The bar 520 and the bar 522 represent existing call types while the bar 524 represents the working class or call type.

If the user experience person is developing a new call type or new working class, FIG. 5 illustrates that the user can select which utterances should be in the working class as well as which utterances should be included as examples in the annotation guide by using the checkboxes that are arranged next to the displayed utterances. If the guide example checkbox is checked but the utterance is not selected for the working class, then that utterance is included in the annotation guide as a negative example. The generate guide hyperlink 506 generates an annotation guide that includes the call types developed by the user.

Using the button 516, a user can submit the selected selections to the working class or call type. The button 516 can also activate the relevance feedback such that a group of utterances that are similar to the utterances identified by the user are presented to the user. When a class or call type is complete, the class is committed along with the class description and the user can begin working on a new class or call type. The generate report hyperlink 518 typically generates a report relating to the annotation guide. For example, the generate report hyperlink 518 may cause a window to be displayed that contains the reports that can be generated. Exemplary reports include, but are not limited to, the current status of the working class or committed call types, a list of the utterances included in the working class or committed call types, a preliminary annotation guide, and the like. The reports can be generated in various formats, including word processing documents, spreadsheets, and XML files.

As previously indicated, the user can analyze or organize the speech data in various manners and the text of selected utterances is displayed to the user. If the user clicks on the text of an utterance, the audio file associated with the text may be played for the user. The control buttons 514 provide other controls for the call type or class being developed. The new search button, for example, may be used to search for utterances for a new call type using a particular string or string variant. The commit button may commit a particular class to the annotation guide and automatically begin a new call type. The abandon button may be used to start a new call type without committing the current call type or class. The delete button may be used to delete a particular call type or class from the annotation guide. One of skill in the art can appreciate that other buttons can be included that perform other functions that have been described herein.

Figure 6:
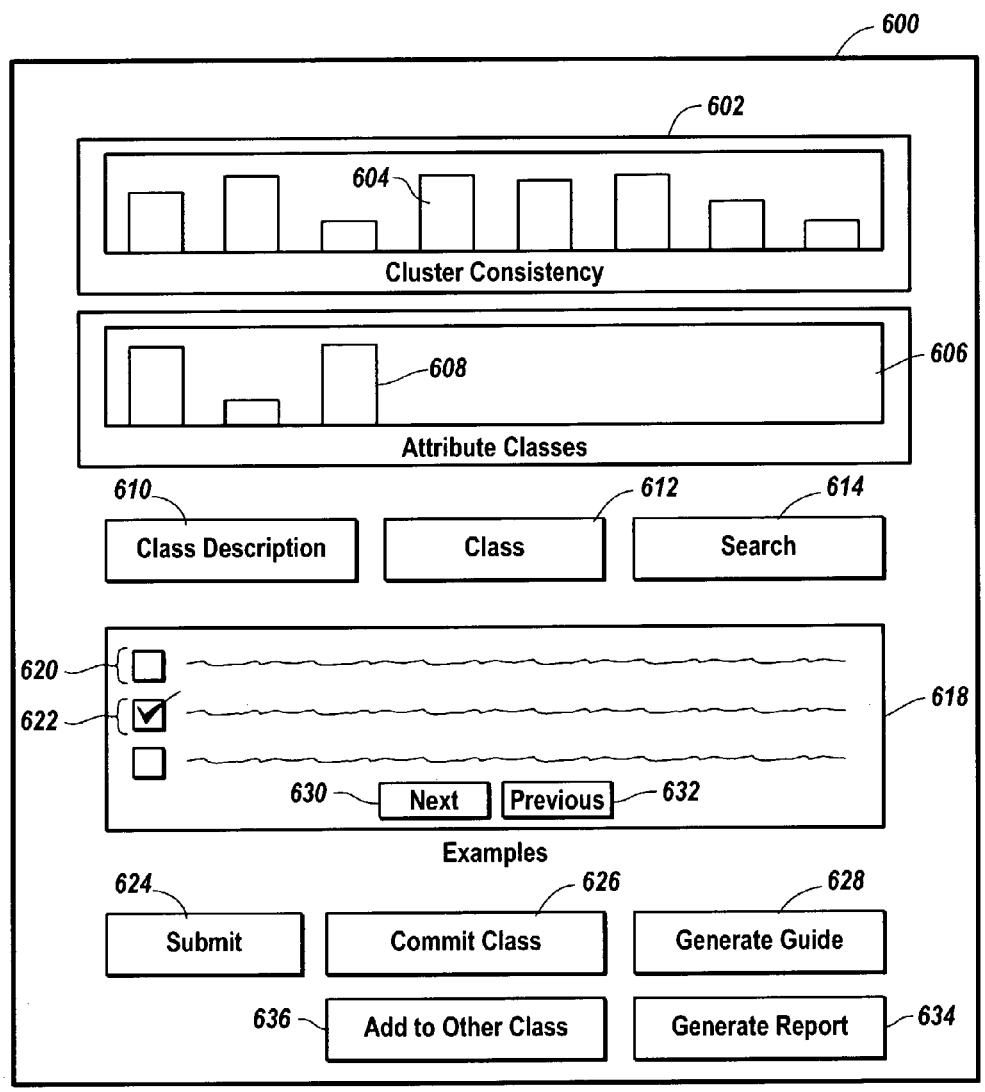
FIG. 6 is another embodiment of a screen shot that illustrates the generation of an annotation guide.

FIG. 6 is another example of a user interface that is used to generate an annotation guide. In this example, N clusters are displayed in the cluster box 602. The size of each cluster in the cluster box 602 is indicated by the height of the cluster. The tightness or consistency of each cluster is shown by the number (not shown) under each cluster. The user can select, for example, the cluster 604 by clicking on the cluster 604 in the cluster box 602. The user is then presented with the utterances in the cluster 604. The attribute classes being worked on or that have already been created are displayed in the class box 606. By selecting, for example, the class 608, a user can continue to refine the selected class. Alternatively, a user can begin a new class or call type as previously described.

The class description button 610 enables the user to enter a description of the class that is currently loaded. The class button 612 is used to enter the class or call type name. The search button 614 lets the user enter search terms to organize the speech data. As previously stated, one of skill in the art can appreciate that other buttons similar to the search button 614 can be included and used to activate other modules that search, analyze, and/or organize the speech data to return an interesting collection of utterances.

The text entry box 618 contains exemplary utterances that are displayed to the user experience person. In this example, the utterance 622 is selected and should be included in the current working class while the utterance 620 is not selected and should not be included in the current working class. Because a particular group of utterances may include more utterances than can be displayed on the screen, additional utterances in the group can be viewed by clicking the next button 630 or the previous button 632.

When a class is completed, the user selects the commit class button 626. If the user experience person has not previously entered a name for the working class (or call type) or has not provided a description of the working class, the user experience person is prompted to provide such. The submit button 624 uses, in one example, the selected utterances as relevant feedback to select a better or more focused group of utterances for the current working class or call type. By using relevance feedback iteratively, the annotation module provides consistent results for a particular class as previously described. After all the classes and/or call types are finished and committed to the annotation guide, the generate guide button 628 generates the annotation guide. The annotation guide is usually represented as a text document but can be represented in other digital forms, including XML, web pages, spreadsheets, and other types of files. A digital annotation guide can be accessed, for example, over a network, from a local storage, or from multiple locations on a network.

The screen shot 600 also illustrates a generate report button 634 that can generate reports as previously described. The reports may take the form of a text document, a spreadsheet, or any other useful representation, including XML. The add to other class button 636 is used to place utterances that are selected in the text entry box 618 into another class. For example, a box containing a current list of committed classes may be displayed and the user experience person selects the appropriate class for the selected utterances.

The user interface may also provide useful data about the speech data to assist the user experience person in developing the annotation guide. For example, the classes or call types can be compared to determine if there is overlap between the various classes or call types. Word distance, for example, can be used to determine if the overlap exists. If the call types overlap, the overlapping call types or classes can be further refined as described herein.

Also, the user interface may also display how many utterances are in a particular class as well as how many utterances are not classified. This helps ensure, in one embodiment, that marginal examples can be included as examples in a particular class. For example, "I have my mail and I have my wallet" is an utterance that should be classified as a Payment call type. This is a marginal example that is difficult to classify.

The user interface may also include a variety of different input mechanisms. For example, each utterance may be associated with multiple checkbox entries that perform particular functions. One checkbox may be used to include the utterance as an example; another checkbox may be used to exclude the utterance from the annotation guide. Another checkbox may be checked such that the checked utterance is used to seed a new search of the speech data.

In this manner, a user experience person can refine a call type more quickly than by manual examination of the speech data. In addition, the annotation guide can be generated automatically and easily improved if necessary. A new call type, for example, can quickly be added or an existing call type can be expanded or become more narrow in scope using the present invention.

The present invention also enables a user experience person to work with more than one cluster or call type at the same time. This is particularly useful when two clusters, for example, are related. The ability to work with more than one cluster or call type at the same time also permits the user experience person to develop call types more quickly as utterances can quickly be moved from one cluster to another cluster or call type. Also, relevance feedback can be used to further refine a cluster or call type after an utterance is moved from one cluster or call type to another.

Figure 7:
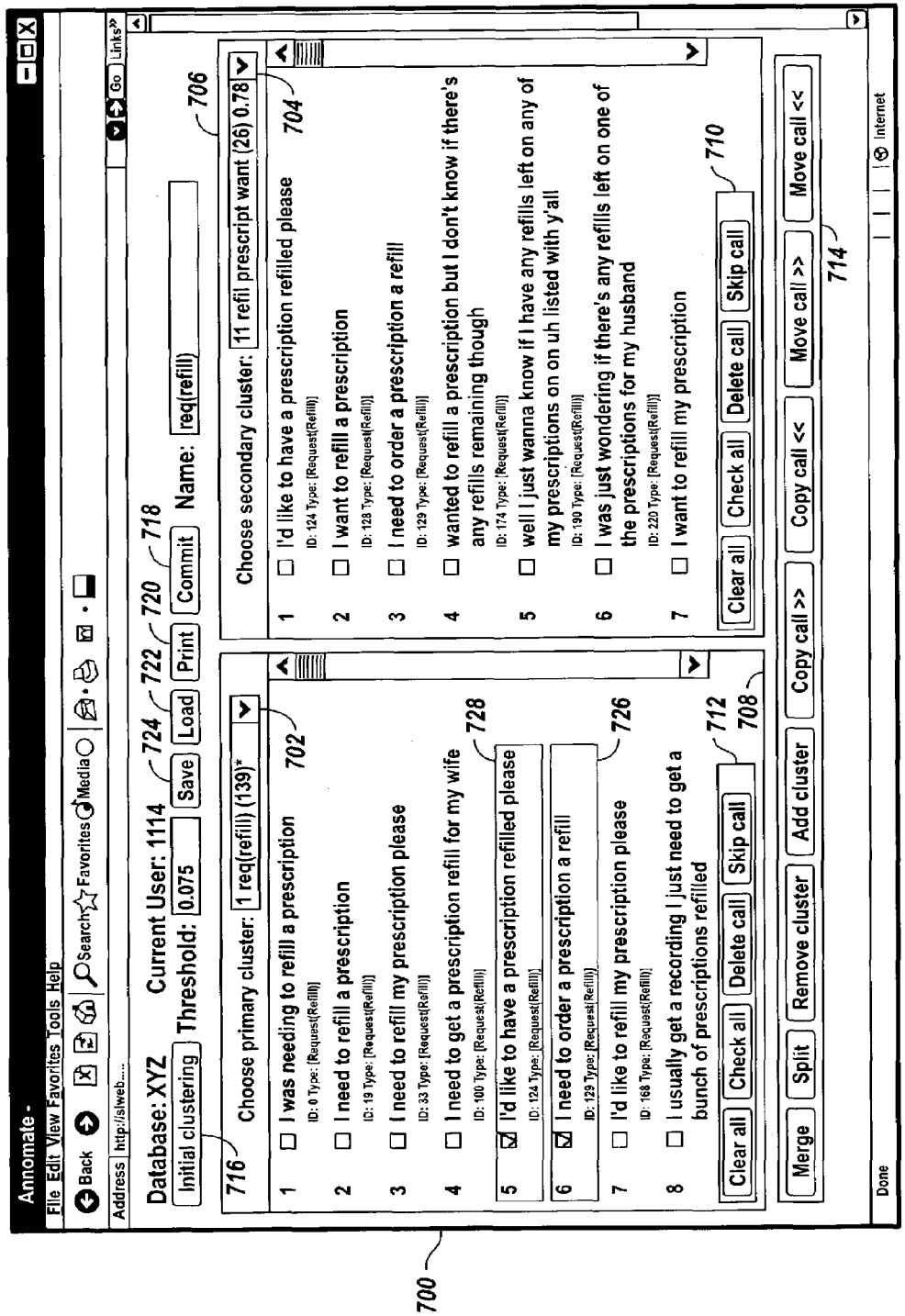
FIG. 7 illustrates another embodiment of a screen shot that illustrates the generation of an annotation guide.

FIG. 7 is another illustration of a screen shot that is used to work with more than one cluster or call type at the same time. In FIG. 7, the pulldown list 702 can be used to select one cluster or call type while the pulldown list 704 is used to select a second cluster or call type. Thus, the box 708 contains utterances from one cluster or call type while the box 706 contains utterances from another cluster or call type. In one example, the clusters in the pulldown list 702 are sorted by size and the clusters in the pulldown list 704 are sorted by their distance from the cluster selected from the pulldown list 702. This enables the user experience person to work with related clusters or call types. One advantage provided by this example is that the user experience person can then begin to provide examples that distinguish between related call types or clusters. In other words, marginal utterances that could arguably belong in either cluster or call type can be specifically placed in a particular cluster or call type by the user experience person.

Within each cluster, the user can use the checkboxes to select certain utterances. The control buttons 712 and 710 then permit the user experience person to delete the selected utterances from the cluster, skip the selected utterances, and the like. The control buttons 714 permit the user experience person to move or copy selected utterances from one cluster or call type to another cluster or call type. For example, the utterances 726 and 728 are selected and can be moved or copied from the cluster in the box 708 to the cluster in the box 706. The clusters can also be merged into a single cluster or the selected utterances in one cluster can be split into another cluster. The call type names and descriptions can be provided or edited as needed. When a user experience person is satisfied, the clusters can be committed using the commit button 718. The screen shot 700 also illustrates that the user experience person can use the save button 724 to save the work space. The load button 722 permits a saved work space to be loaded. The print button 720 may print, for example, the utterances in a particular cluster such as the utterances displayed in the box 706 or 708.

The present invention extends to both methods and systems for generating an annotation guide. The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for generating an annotation guide, wherein the annotation guide is used by labelers to annotate speech data, the method comprising:
   analyzing speech data to present a user with a plurality of utterances;
   receiving user-selected utterances from the plurality of utterances, the user-selected utterances associated with a call type; and
   analyzing the speech data to identify additional utterances that are similar to the user-selected utterances, wherein the identified additional utterances and the user-selected utterances are used to generate an annotation guide used by labelers to annotate speech data.

2. A method as defined in claim 1, wherein analyzing speech data to present a user with a plurality of utterances further comprises one or more of:
   organizing the speech data into clusters, wherein a particular cluster is selected by the user and displayed to the user and wherein the particular cluster contains the plurality of utterances;
   searching the speech data using a string or a variant of the string to identify the plurality of utterances; and
   categorizing the speech data using a data mining module.

3. A method as defined in claim 1, wherein analyzing the speech data to find additional utterances that are similar to the user-selected utterances further comprises using the user-selected utterances as feedback to identify the additional utterances.

4. A method as defined in claim 1, wherein analyzing the speech data to identify additional utterances that are similar to the user-selected utterances further comprises at least one of:
   identifying at least one utterance to be included in the call type;
   identifying at least one utterance to be excluded from the call type;
   identifying the additional utterances using relevance feedback;
   identifying the additional utterances using a string search;
   identifying the additional utterances using data clustering;
   mining the speech data to identify the additional utterances; and
   using active learning to identify marginal utterances in the speech data.

5. A method as defined in claim 1, further comprising selecting some of the additional utterances to be included in the call type.

6. A method as defined in claim 5, further comprising committing the call type to an annotation guide.

7. A method as defined in claim 6, further comprising:
   generating additional call types to be included in the annotation guide; and
   generating the annotation guide.

8. A method for generating an annotation guide, wherein the annotation guide is used by labelers to annotate speech data, the method comprising:
   presenting a user with a plurality of utterances from speech data;
   receiving one or more user-selected utterances from the plurality of utterances, wherein the user-selected utterances are in a working class;
   identifying additional utterances in the speech data that are similar to the user-selected utterances, wherein some of the additional utterances are included in the working class; and
   committing the working class to an annotation guide used by labelers to annotate the speech data.

9. A method as defined in claim 8, wherein presenting a user with a plurality of utterances from the speech data further comprises clustering the speech data into N clusters.

10. A method as defined in claim 8, wherein presenting a user with a plurality of utterances further comprises performing a string search on the speech data.

11. A method as defined in claim 8, wherein presenting a user with a plurality of utterances further comprises mining the speech data to retrieve a group of utterances from the speech data.

12. A method as defined in claim 8, wherein presenting a user with a plurality of utterances further comprises displaying the plurality of utterances to the user.

13. A method as defined in claim 8, wherein receiving one or more user-selected utterances from the plurality of utterances further comprises one or more of:

identifying at least one utterance to be included in the working class;

identifying at least one utterance to be excluded from the working class;

identifying at least one utterance to be included in the annotation guide as a positive example; and identifying at least one utterance to be included in the annotation guide as a negative example.

14. A method as defined in claim 8, wherein receiving one or more user-selected utterances from the plurality of utterances, further comprises using the user-selected utterances as feedback to identify the additional utterances.

15. A method as defined in claim 8, wherein committing the working class to an annotation guide further comprises providing a description of the working class.

16. A method as defined in claim 8, further comprising generating the annotation guide.

17. A computer program product having computer-executable instructions for performing the method of claim 8.

18. A method for generating an annotation guide for use in annotating speech data, wherein the annotation guide includes one or more call types, the method comprising:

creating a call type for inclusion in an annotation guide, wherein creating a call type comprises:

retrieving a plurality of utterances from speech data, wherein the plurality of utterances are displayed to a user;

identifying user-selected utterances from the plurality of utterances, wherein the user-selected utterances are included in the call type;

identifying additional utterances from the speech data based on the user-selected utterances, wherein some of the additional utterances are included in the call type; and committing the call type to the annotation guide; and generating the annotation guide, wherein the annotation guide includes at least each committed call type.

19. A method as defined in claim 18, wherein creating a call type further comprises including a description of the call type, wherein the description is included in the annotation guide.

20. A method as defined in claim 18, wherein retrieving a plurality of utterances from speech data further comprises analyzing the speech data.

21. A method as defined in claim 20, wherein analyzing the speech data further comprises at least one of:

clustering the speech data into N clusters;

performing relevance feedback using the user-selected utterances;

searching the speech data for utterances that include a particular string or a variant of the particular string; and mining the speech data to identify a group of related utterances.

22. A method as defined in claim 20, wherein identifying user-selected utterances from the plurality of utterances further comprises using the selected one or more utterances as feedback to identify the additional utterances from the speech data.

23. A method as defined in claim 20, wherein identifying user-selected utterances from the plurality of utterances further comprises identifying at least one utterance to be included in the annotation guide for the call type as a positive example.

24. A method as defined in claim 20, wherein identifying user-selected utterances from the plurality of utterances further comprises identifying at least one utterance to be included in the annotation guide for the call type as a negative example.

25. A method as defined in claim 20, further comprising iteratively retrieving additional utterances based on selected utterances.

26. A method as defined in claim 18, wherein committing the call type further comprises retrieving new utterances from the speech data for generating a new call type.

27. A method as defined in claim 18, wherein retrieving a plurality of utterances from speech data further comprising linking each of the utterances to an audio file, wherein the audio file associated with a particular utterance is played if the particular utterance is selected.

28. A computer program product having computer-executable instructions for implementing the method of claim 18.

29. A method for generating an annotation guide from speech data, the method comprising:

analyzing speech data to present a user with a first group of utterances;

analyzing the speech data to present a user with a second group of utterances that are related to the first group of utterances; and defining a first call type in the first group of utterances and defining a second call type in the second group of utterances by performing one or more of:

removing one or more utterances from the first group of utterances or the second group of utterances;

copying a particular utterance from the first group of utterances to the second group of utterances;

moving a particular utterance from the first group of utterances to the second group of utterances;

analyzing the speech data to find additional utterances for the first group of utterances using selected utterances from the first group of utterances; and analyzing the speech data to find additional utterances for the second group of utterances using selected utterances from the second group of utterances.

30. A method as defined in claim 29, wherein analyzing the speech data to find additional utterances for the first group of utterances further comprises using the selected utterances as feedback to identify the additional utterances in the speech data that are similar to the selected utterances.

31. A method as defined in claim 29, wherein analyzing the speech data to present a user with a first group of utterances further comprises one or more of:

clustering the speech data into N clusters;

searching the speech data using a string or a variant of the string;

mining the speech data using speech parameters;

using selected utterances as feedback to identify similar utterances in the speech data; and identifying marginal utterances of a particular call type using both positive and negative examples of the particular call type.

32. A method as defined in claim 29, further comprising committing the first group of utterances to the first call type and committing the second group of utterances to the second call type.

33. A method as defined in claim 32, further comprising generating an annotation guide.

* * * * *